Patented Aug. 1, 1950

2,517,146

UNITED STATES PATENT OFFICE 2,517,146

DICARBOXYPHENYLSILANES

Leslie J. Tyler, Midland, Mich., assignor to Dow Corning Corporation, Midland, Mich., a corporation of Michigan No Drawing. Application July 5, 1949, Serial No. 103,169

1 Claim. (Cl. 260—448.2)

This invention relates to carboxyphenylsilanes.

It is an object of this invention to prepare difunctional silanes which will be of utility in the preparation of copolymers of the polyamide and alkyd type.

This invention relates to dicarboxyphenyldimethylsilane having the formula

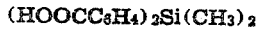

$(HOOCC_6H_4)_2Si(CH_3)_2$

The above compound may be prepared by two general methods. One is the oxidation of ditolyldimethylsilane under conditions whereby the methyl radical of the tolyl group is oxidized to a carboxyl group. This oxidation may be effected for example by heating the silane with alkaline potassium permanganate or by air blowing it at elevated temperatures in the presence of a metallic oxide catalyst such as $MnO_2$ and $Cr_2O_3$. The second method is by carbonating the Grignard reagent of dibromophenyldimethylsilane.

Dicarboxyphenyldimethylsilane may be reacted with polyhydric alcohols and polyfunctional amines to produce resins of the polyamide and alkyd type. For example, dicarboxyphenyldimethylsilane was mixed with ethylene diamine and the mixture was heated at 110° C. Reaction took place to produce a viscous resinous material.

A similar material was obtained when the silane was reacted with ethanolamine.

The following example is illustrative only.

Example

A mixture of 9.2 g. of di-P-bromophenyldimethylsilane and 2.4 g. of magnesium turnings in 27 ml. of dry ether were stirred and heated to reflux. After five hours the magnesium had dissolved and the Grignard reagent was poured over a large excess of solid carbon dioxide powder. The ether solution was acidified with aqueous HCl whereupon 6.1 g. of a solid material was obtained. This material was purified by dissolving it in ethanol and precipitating the material by the addition of water. The purified product was a cream-colored powder which melted with decomposition at 288° C. Upon analysis it was found to have 9.04 percent Si and to have a neutral equivalent of 150. This data together with infrared analysis shows that the material is di-P-carboxyphenyldimethylsilane.

That which is claimed is:

Dicarboxyphenyldimethylsilane.

LESLIE J. TYLER.

No references cited.